United States Patent
Allen et al.

(10) Patent No.: US 8,267,416 B2
(45) Date of Patent: Sep. 18, 2012

(54) INDEPENDENT REAR SUSPENSION

(75) Inventors: Steve Scott Allen, Saline, MI (US);
Alberto Girelli Consolaro, Aachen (DE); Paul Zandbergen, Montzen (BE); Greg N. Gombert, Canton, MI (US); Andrew B. Lane, Ypsilanti, MI (US); Steven C Hopson, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 107 days.

(21) Appl. No.: 12/787,927

(22) Filed: May 26, 2010

(65) Prior Publication Data
US 2011/0291376 A1  Dec. 1, 2011

(51) Int. Cl.
*B60G 3/18* (2006.01)
*B60G 3/20* (2006.01)
(52) U.S. Cl. ................... 280/124.135; 280/124.143
(58) Field of Classification Search ............. 280/93.512, 280/124.125, 124.134, 124.135, 124.136, 280/124.139, 124.143
See application file for complete search history.

(56) References Cited

U.S. PATENT DOCUMENTS

| | | | |
|---|---|---|---|
| 4,714,270 A * | 12/1987 | Rumpel | 280/124.144 |
| 4,802,688 A | 2/1989 | Murakami et al. | 280/666 |
| 5,380,024 A * | 1/1995 | Hayami | 280/124.143 |
| 5,845,926 A * | 12/1998 | Davis et al. | 280/124.136 |
| 5,851,016 A * | 12/1998 | Kawagoe et al. | 280/124.148 |
| 6,027,130 A | 2/2000 | Kawabe et al. | 280/124.135 |
| 6,099,005 A * | 8/2000 | Wakatsuki | 280/124.135 |
| 6,302,420 B1 | 10/2001 | Sano | 280/124.134 |
| 6,588,779 B2 * | 7/2003 | Sandahl et al. | 280/124.135 |
| 6,752,409 B1 * | 6/2004 | Kunert | 280/124.138 |
| 2002/0043780 A1 | 4/2002 | Sandahl et al. | 280/124.135 |

FOREIGN PATENT DOCUMENTS
KR    2003-0017670    3/2003
* cited by examiner

*Primary Examiner* — Joseph Rocca
(74) *Attorney, Agent, or Firm* — L. C. Begin & Associates, PLLC

(57) ABSTRACT

A wheel suspension system for a vehicle includes a first member pivotably coupled to a portion of the vehicle so as to be pivotable about a first rotational axis which forms an angle with a vertical plane extending through a fore-aft axis of the vehicle.

35 Claims, 4 Drawing Sheets

INDEPENDENT REAR SUSPENSION

BACKGROUND OF THE INVENTION

The present invention relates to vehicle suspension systems and, more particularly, to an independent rear suspension system.

SUMMARY OF THE INVENTION

In one aspect of the embodiments of the present invention, a wheel suspension system for a vehicle is provided including a first member pivotably coupled to a portion of the vehicle so as to be pivotable about a first rotational axis which forms an angle β with a vertical plane extending through a fore-aft axis of the vehicle.

In another aspect of the embodiments of the present invention, a wheel suspension system for a vehicle is provided including a knuckle for rotatably carrying a wheel, a first member coupled to a portion of the vehicle so as to be pivotable with respect to the portion of the vehicle, and a second member rotatably connected to both the knuckle and the first member.

In another aspect of the embodiments of the present invention, a wheel suspension system for a vehicle is provided including a first member coupled to a portion of the vehicle at a first rotational connection and at a second rotational connection. The second rotational connection is positioned outboard of the first rotational connection with respect to a fore-aft axis of the vehicle.

DETAILED DESCRIPTION

Figure 1:
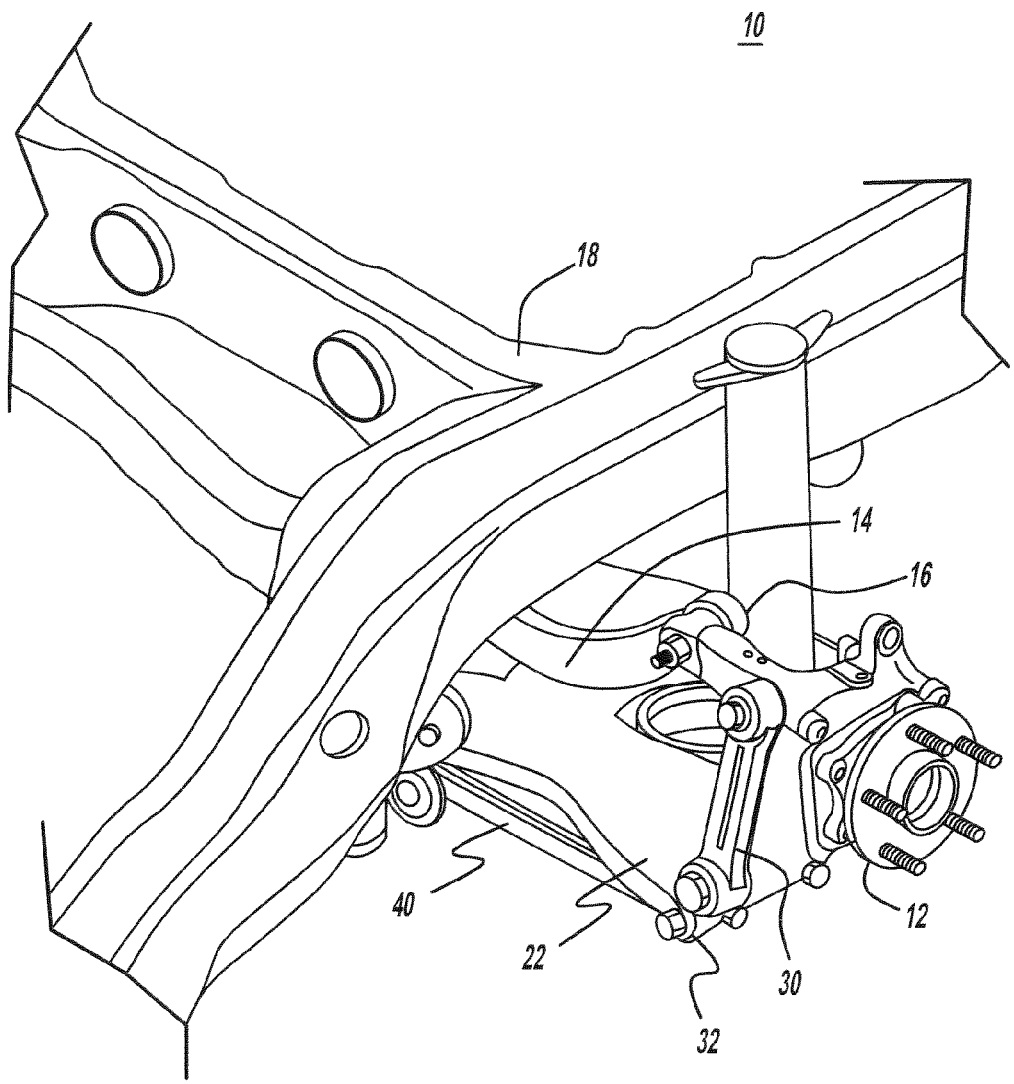
FIG. 1 is a perspective view of a suspension system in accordance with an embodiment of the present invention.

FIGS. 1-4 show a vehicle suspension assembly 10 in accordance with one embodiment of the present invention. The vehicle suspension assembly 10 may be utilized in any of a variety of vehicles. As used herein, the term "vehicle" is understood to encompass any means in or by which someone travels or something is carried or conveyed; a means of conveyance or transport. Although the embodiments of the present invention can be utilized on a variety of specific suspension designs, both front and rear, in one embodiment it is contemplated that the present invention be utilized on an automotive rear suspension.

Referring to FIGS. 1-4, the automotive suspension assembly 10 includes a vehicle suspension sub-frame 18 and a vehicle wheel knuckle 12 operatively coupled to a portion of the vehicle via a first member 22, a toe link 40, and an upper link 14. In one embodiment, first member 22 is in the form of a lower control arm pivotably coupled to a sub-frame 18 of the vehicle. Control arm 22 is substantially rigid and includes attachment portions for facilitating connection between the control arm 22 and sub-frame 18 and also between the control arm and other elements of the suspension. The attachment portions may, for example, be in the form of devises, single shear attachments, and/or mount joints, formed as portions of the lower control arm 22 and configured for receiving therein couplings for rotationally attaching the lower control arm to sub-frame 18 and to other elements of the suspension. The attachment portions may also have forms other than those listed above, depending on the connection and operational requirements of a particular application.

Figure 4:
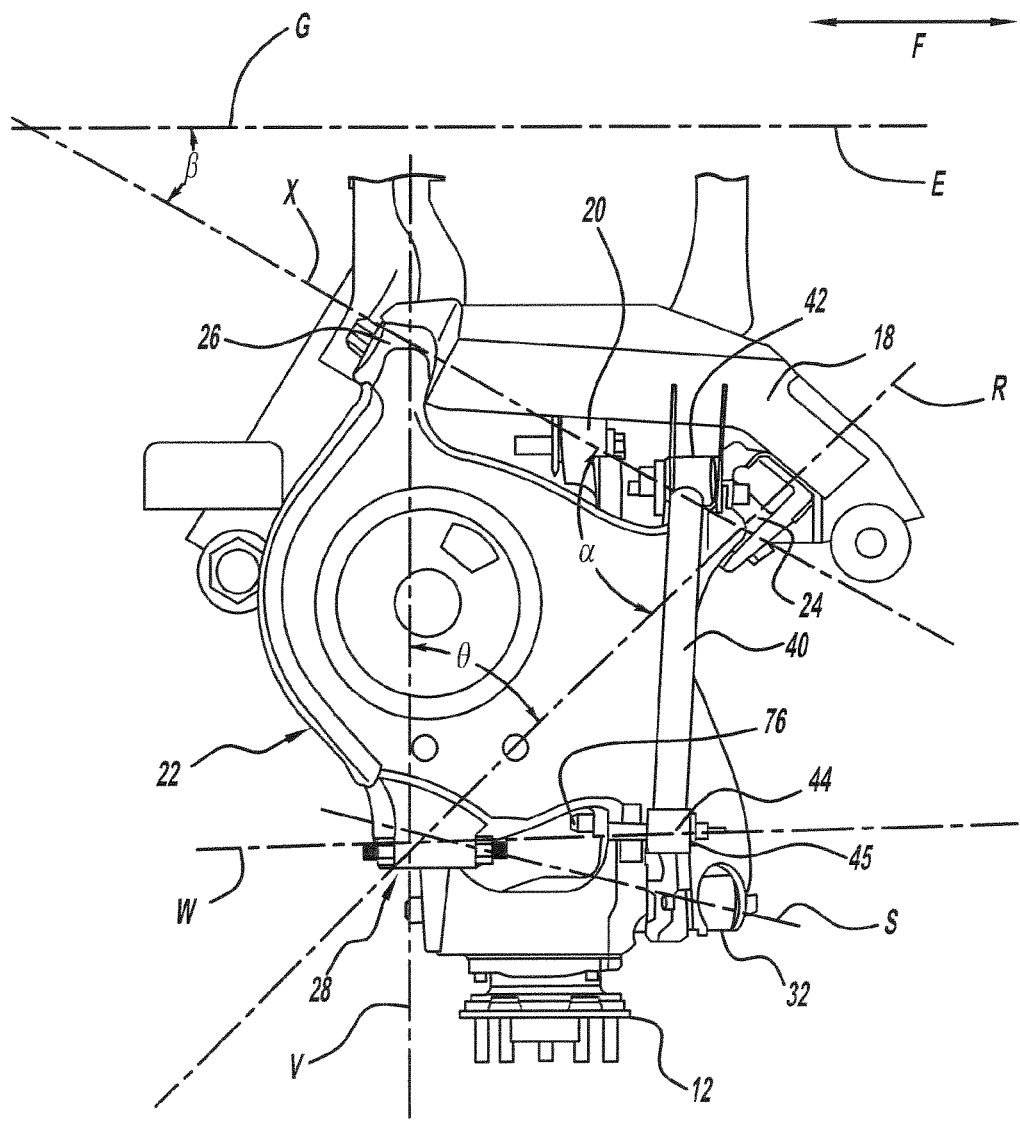
FIG. 4 is an underside view of the embodiment shown in FIG. 1.

Referring to FIG. 4, in one embodiment, the lower control arm 22 is rotatably connected to the vehicle sub-frame 18 via first and second rotational connections 26 and 24, respectively. Although a variety of rotational connections 24 and 26 are contemplated, one particular embodiment contemplates the use of a ball-joint for first connection 26 and a bushing for second connection 24 to rotatably connect control arm 22 to sub-frame 18. Ball-joint 26 may be relatively stiff to promote rapid response in vehicle handling. In a particular embodiment, connection 26 is a cross-axis ball joint. In other embodiments, however, alternative rotational attachments are contemplated. For example, connection 26 may be a bushing instead of a ball joint. Ball joint 26 and bushing 24 allow the control arm 22 to pivot about the attachments with respect to frame 18. Also, in the embodiment shown in FIG. 4, as lateral loading of steering knuckle 12 acts primarily along a plane V along which knuckle 12 is connected to control arm 22 (as described in greater detail below), bushing 24 may be relatively "soft" to aid in attenuating longitudinal vehicle loading (due to, for example, acceleration, braking, and collisions with potholes), thereby enhancing vehicle ride quality.

In the embodiments described herein, connection 24 is positioned relatively higher on the vehicle than connection 26. This configuration contributes to reducing lift and squat, and to enhancing kinematic wheel recession. In embodiments of the present invention, connection 24 is also positioned outboard of connection 26 with respect to the vehicle fore-aft axis E. This enables a sub frame design that is relatively compact in the fore-aft direction and also contributes to reduced sub-frame loading at the connections 24 and 26. When a rotational connection is described herein as being positioned "outboard" of another rotational connection or "inboard" of another rotational connection with respect to vehicle fore-aft axis E or with respect to vertical plane G, the pertinent features used for determining the relative positions of the rotational connections are the intersection of a plane bisecting the bushing and the bushing rotational axis (for a bushing) and the rotational center of the ball joint (for a ball joint). Thus, for example, where a bushing is described as being positioned outboard of a ball joint with respect to plane G, this is understood to mean that the intersection of a plane bisecting the bushing and the bushing rotational axis is positioned outboard of the rotational axis of the ball joint.

Bushing 24 may be relatively soft in directions transverse to the bushing rotational axis to enhance longitudinal compliance. Bushing 24 may be relatively stiffer in vertical directions (indicated by arrows C and D in FIG. 3) to react to forces introduced by wind-up torque on the wheel and transferred through the torque link 30 (described below).

Referring to FIG. 4, a first rotational axis X may be defined as extending through the center of rotation of ball joint 26 and also through the intersection of a plane bisecting the bushing 24 with the bushing rotational axis. Thus, the first rotational connection 26 and the second rotational connection 24 are positioned along first axis X. Lower control arm 22 rotates with respect to the sub-frame 18 about axis X during movement of the suspension due to jounce and rebound. FIG. 4 shows a vertical plane G extending through the vehicle fore-aft axis E. The vehicle fore-aft axis E is generally understood to extend along a longitudinal centerline of the vehicle in a first direction in which the vehicle would travel when its front or guiding wheels are straightened, and in a second direction opposite the first direction. It will be understood that the position of axis E shown in FIG. 4 is not the actual position of the axis with respect to the elements of the vehicle shown in the Figure. Thus, the spacing between axis E/plane G and the other vehicle elements shown in FIG. 4 does not reflect the actual spacing between fore-aft axis E/plane G and these vehicle elements. Rather, the plane G and axis E are shown in this view to indicate their orientations with respect to axis X and other elements and features to which they may be referenced.

In the embodiment shown herein, the vehicle fore-aft axis E extends in the directions indicated by arrow F. First axis X does not extend parallel to plane G, but rather resides at an angle $\beta$ with respect to plane G. In this manner, the embodiment shown provides a first member (in this embodiment, lower control arm 22) pivotably coupled to a portion of the vehicle (in this embodiment, the vehicle sub-frame 18) so as to be pivotable about first axis X which forms an angle $\beta$ with a vertical plane G extending through a fore-aft axis E of the vehicle. This angular orientation of axis X with respect to the vehicle fore-aft axis reduces the fore-aft distance between the connections 26 and 24, thereby providing a more compact fore-aft system package. In a particular embodiment, angle $\beta$ is at least 20 degrees.

Referring again to FIG. 4, the lower control arm 22 is rotatably connected to the knuckle 12 via a third rotational connection generally designated 28. Although a variety of rotational connections 28 are contemplated, one particular embodiment contemplates the use of a relatively stiff bushing having a rotational axis W oriented substantially parallel to the vehicle fore-aft axis and mounted to the knuckle 12. In another embodiment, rotational connection 28 is in the form of a ball joint. In additional embodiments, however, alternative rotational attachments are contemplated. In an embodiment utilizing a bushing for connection 28, the bushing 28 allows the knuckle 12 to move in a vertical direction relative to the vehicle sub-frame 18 (via the connection with lower control arm 22) while still receiving support from the lower control arm.

A second rotational axis R may be defined as extending through the intersection of a plane bisecting the bushing 24 with the bushing rotational axis, and also through the intersection of a plane bisecting the bushing 28 with the bushing rotational axis. Thus, the second rotational axis R extends through the second rotational connection 24 and the third rotational connection 28. In one embodiment, an angle $\alpha$ between axis X and axis R is in the range of about 65 degrees to about 85 degrees. In a particular embodiment, angle $\alpha$ is about 75 degrees.

The lower control arm 22 is also configured in such a way that third rotational connection 28 is in or near lateral alignment with first rotational connection 26 (i.e., connection 28 lies along or near a plane V which extends substantially perpendicular to the vehicle fore-aft axis and which extends through the rotational center of ball joint 26). In this configuration, lateral loading on the sub-frame is introduced mainly through ball joint 26 which is connected to a relatively stiff rear cross member of the sub frame. This substantially directs or channels the lateral loading on the knuckle 12 along a known, predictable axis. This configuration also provides relatively high lateral stiffness and camber stiffness, which is beneficial for the vehicle steering and handling characteristics. Longitudinal loading on the suspension is introduced primarily in the transverse direction of bushing 24 because connection 26 is a ball joint, and because of the spatial relationship between ball-joint 26 and bushing 28. In one embodiment, an angle $\theta$ between plane V and axis R is in the range of about 35 degrees to about 55 degrees. In a particular embodiment, angle $\theta$ is about 45 degrees.

Figure 2:
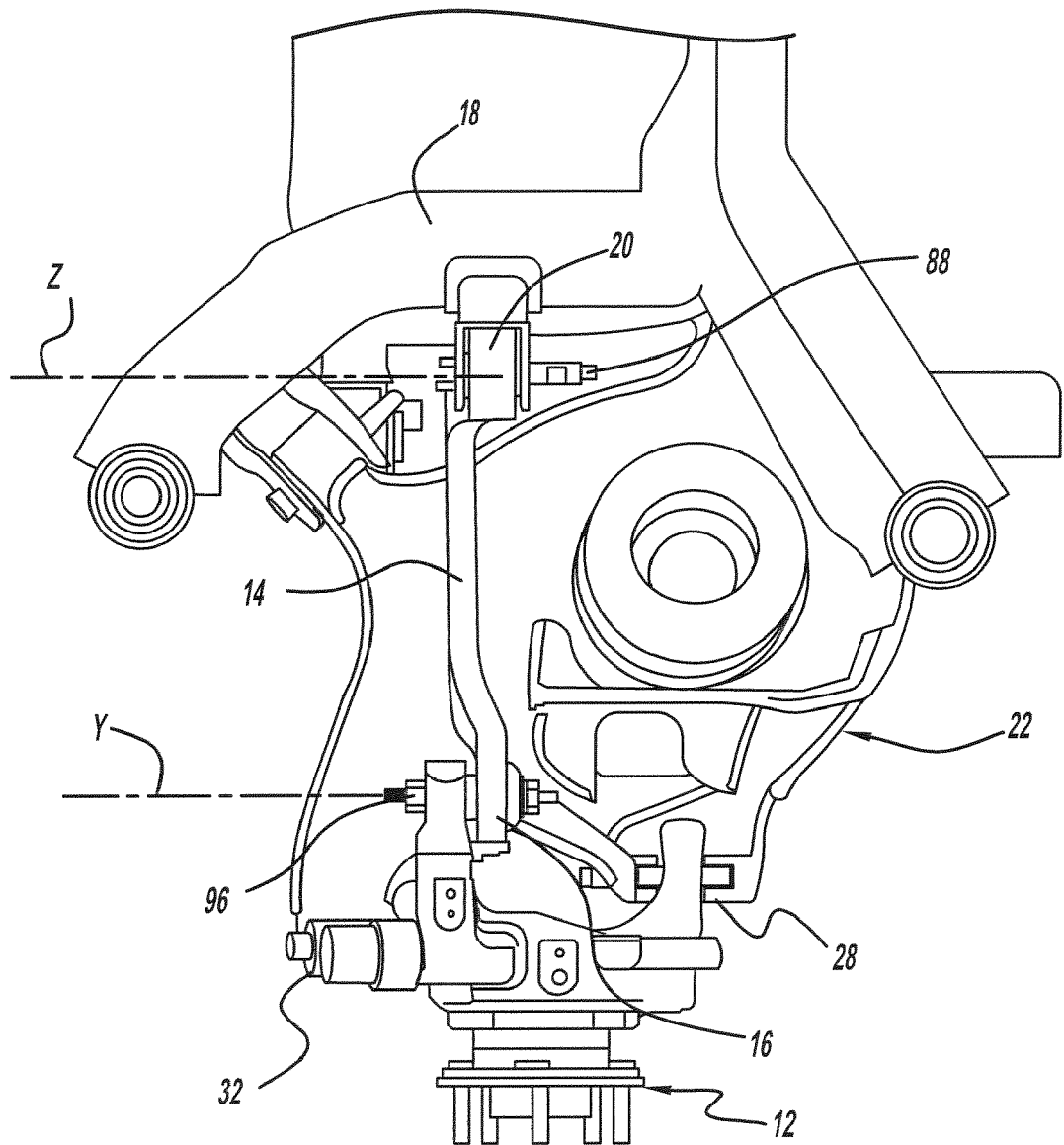
FIG. 2 is a plan view of the embodiment shown in FIG. 1.

Referring to FIGS. 1 and 2, the upper part of the knuckle 12 is connected to the sub frame with a single upper link 14. The upper link 14 is rotatably connected to knuckle 12 via a rotational connection 16. Although a variety of rotational connections 16 are contemplated, one embodiment contemplates the use of a bushing having a rotational axis Y oriented substantially parallel to the vehicle fore-aft axis F and mounted to the upper link 14. A shaft 96 mounted to knuckle 12 extends along axis Y and engages bushing 16, allowing the knuckle 12 to move in a vertical direction relative to the vehicle during operation while still receiving support from the upper link 14. Although the shaft 96 may have any of a variety of configurations, it is illustrated in FIG. 2 as a bolt fastener assembly. In another embodiment, the connection between the upper link 14 and knuckle 12 is in the form of a ball-joint.

Referring to FIG. 2, upper link 14 is also rotatably connected to sub-frame 18 via a rotational connection 20. Although a variety of rotational connections 20 are contemplated, one embodiment contemplates the use of a bushing having a rotational axis Z oriented substantially parallel to the vehicle fore-aft axis F and mounted to the frame 18. In the embodiment shown in FIG. 2, the rotational attachment 20 further includes an upper link shaft 88 mounted to upper link 14. Although the upper link shaft 88 may have any of a variety of configurations, it is illustrated in FIG. 2 as a bolt fastener assembly. Shaft 88 extends through bushing 20 along axis Z and engages bushing 20 to allow the upper link 14 to rotate about axis Z with respect to frame 18.

The upper link reacts mainly to lateral forces acting on knuckle 12. The torque link 30 (described below) reacts to wind-up torque acting on the wheel due to longitudinal loads, including impacts, vehicle starts and vehicle stops. The torque link also reacts to wind-up forces due to the damper and spring loads on the control arm. This eliminates the need for a relatively bulkier, more massive upper control arm having two connections to the sub-frame. Thus, an upper link 14 in accordance with an embodiment of the present invention, used in conjunction with the torque link 30, enables incorporation of a relatively low vehicle load floor because a single link is relatively easier to package than a relatively bulkier control arm when used in combination with a low side rail and drive shafts for driven axles. In addition, the geometry of the upper link 14 and/or the locations of its connections to sub-frame 18 and/or knuckle 12 may be configured so as to provide a desired degree of camber gain.

Referring to FIG. 4, the knuckle 12 is also coupled to sub-frame 18 via a toe link 40. The knuckle 12 is rotatably connected to toe link 40 via a rotational connection generally designated 44. Although a variety of rotational connections 44 are contemplated, one embodiment contemplates the use of a bushing 45 mounted in an opening formed in toe link 40. In an alternative embodiment, rotational connection 44 is in the form of a ball joint. In other embodiments, however, alternative rotational attachments are contemplated. The bushing 45 allows the knuckle 12 to move in a vertical direction relative to the vehicle frame 18 while still receiving support from the frame via the toe link.

In the embodiment shown in FIG. 4, an opening is formed in a portion of the knuckle, and the rotational attachment 44 further includes a shaft 76 extending through the knuckle opening and through a rotational axis of bushing 45. Although the shaft 76 may have any of a variety of configurations, it is illustrated in FIG. 4 as a bolt fastener assembly.

Referring again to FIG. 4, toe link 40 is also rotatably connected to sub-frame 18 via a rotational connection generally designated 42. Although a variety of rotational connections 42 are contemplated, one embodiment contemplates the use of bushing mounted in an opening formed in the toe link 40. In other embodiments, however, alternative rotational attachments are contemplated. The bushing 42 allows the toe link 40 to rotate about a rotational axis of bushing 42 with respect to frame 18. In the embodiment shown in FIG. 4, an opening is formed in a portion of the toe link, and the rotational attachment 42 further includes a shaft (not shown) extending through the toe link opening and through the rotational axis of bushing 42. Although the shaft may have any of a variety of configurations, in one embodiment it is in the form of a bolt fastener assembly. In an alternative embodiment, rotational connection 42 is in the form of a ball joint. In a particular embodiment, at least one of the connections 42 and 44 is a bushing. This permits a certain amount of compliance steer in the rear wheels during cornering.

The toe link 40 is used to control contributions to or components of the steer angle, including bump steer, lateral compliance steer and longitudinal compliance steer components, without interactions of the other system links. The toe link is positioned forward of the wheel center. With the relatively stiff ball-joint 26 connecting the control arm 22 positioned aft of the wheel center, compliance provided by toe link bushings 42 and 44 provides a toe-in effect when lateral forces act on the wheel. The toe link 40 is also positioned under the lower control arm 22. In this position it contributes to high camber stiffness. In addition, the configuration and positioning of toe link 40 below the lower control arm as shown enables the vehicle body rail 199 (see FIG. 3) to begin sloping downward farther toward the rear of the vehicle, thereby enhancing the vehicle interior package.

Figure 3:
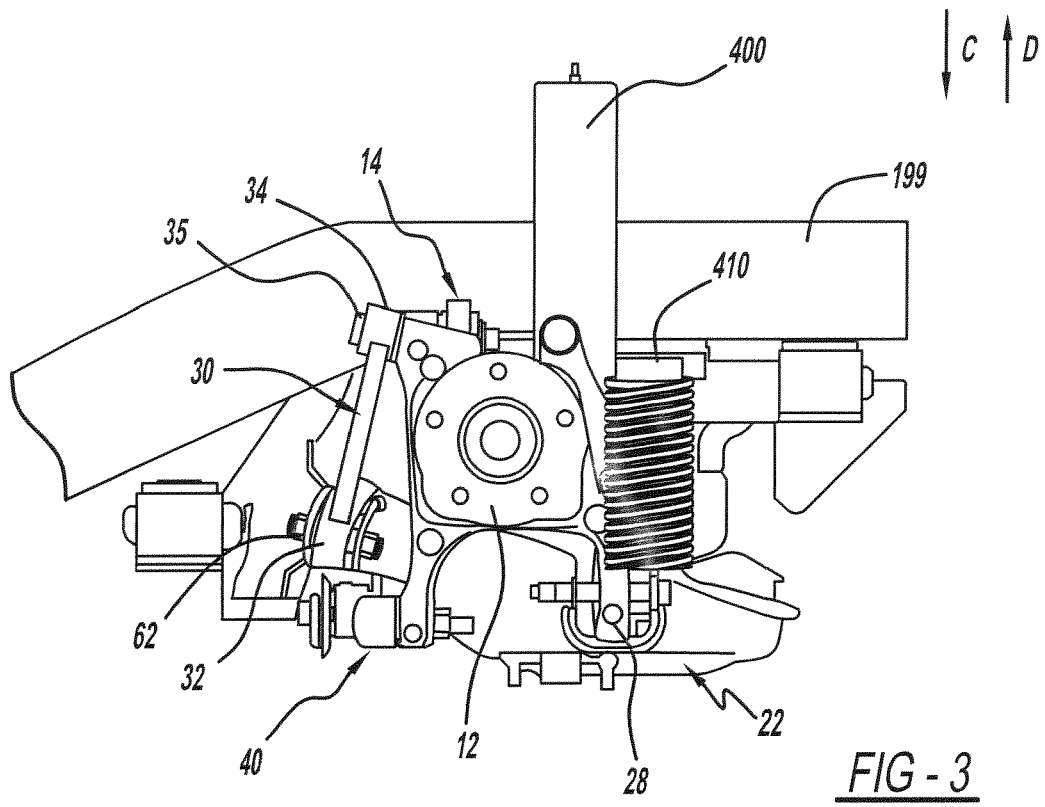
FIG. 3 is a side view of the embodiment shown in FIG. 1.

Referring to FIGS. 1 and 3, a separate additional second member 30 also couples knuckle 12 to first member 22. In one embodiment, shown in FIGS. 1-4, second member 30 is in the form of a torque link connecting knuckle 12 to lower control arm 22. Link 30 is rotatably connected to the lower control arm 22 via a fourth rotational connection generally designated 32. Although a variety of rotational connections 32 are contemplated, one embodiment contemplates the use of a bushing 33 mounted to the link 30. In an alternative embodiment, rotational connection 32 incorporates a ball-joint. In other embodiments, however, alternative rotational attachments are contemplated. In the embodiment shown in FIGS. 1 and 3, the rotational attachment 32 further includes a shaft (not shown) mounted to a lower mount joint 62 such as a clevis, a single shear attachment, or a mount joint, formed as a portion of the lower control arm 22. Although the shaft may have any of a variety of configurations, in one embodiment it is in the form of a bolt fastener assembly.

Referring to FIG. 4, it may be seen that connection 32 is positioned outboard of connection 28 connecting lower control arm 22 to knuckle 12. This arrangement enhances kinematic recession and also enhances the anti-squat performance of the suspension system.

Figure 5:
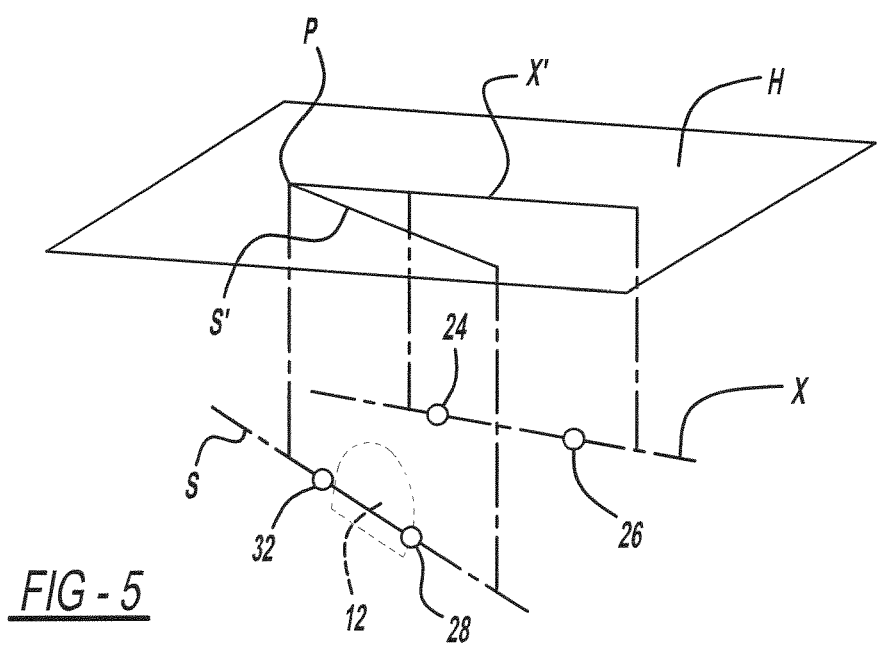
FIG. 5 is a schematic view illustrating an aspect of a spatial arrangement of a pair of axes associated with an embodiment of the present invention.

Referring to FIG. 4, a third axis S may be defined as extending through the center of rotation of bushing 28 and also through the intersection of a plane bisecting the bushing 32 with the bushing rotational axis. It may be seen from FIGS. 4 and 5 that a projection S' of axis onto a horizontal plane H and a projection X' of axis X onto the horizontal plane will intersect at a point P forward of the knuckle 12.

Referring again to FIG. 3, link 30 is also rotatably connected to knuckle 12 via a fifth rotational connection generally designated 34. Although a variety of rotational connections 34 are contemplated, one embodiment contemplates the use of a bushing 35 mounted in an opening formed in the link 30. In an alternative embodiment, rotational connection 34 incorporates a ball-joint. In other embodiments, however, alternative rotational attachments are contemplated. In the embodiment shown in FIG. 3, the rotational attachment 34 further includes a stud (not shown) mounted on knuckle 12 to engage bushing 35 along a rotational axis of the bushing.

Link 30 reacts to any wind-up torque acting on the knuckle 12 to provide high caster stiffness. This eliminates the need for an upper control arm with two mounting connections to the sub-frame for controlling the wind-up torque. In the embodiment shown in FIGS. 1-4, link 30 has a longitudinal axis oriented generally perpendicularly to the portion of lower control arm 22 to which it is rotatably connected. It may also be seen from FIG. 2 that fourth rotational connection 32 is positioned outboard of third rotational connection 28 with respect to the vehicle fore-aft axis.

In the present embodiments, the wheel steer angle is not constrained by link 30 or by any other member used to react to the wind-up torque between knuckle 12 and the lower control arm 22 during starting and stopping of the vehicle.

In another alternative embodiment, the torque link is replaced by a single bushing or another element that constrains the rotation of the knuckle 12 relative to the lower control arm 22. This alternative connection is configured so that it does not constrain rotation of knuckle 12 around the wheel steer axis.

The suspension springs 410 and dampers 400 are mounted to the lower control arm 22 behind the wheel centre line (or rearwardly of a rotational axis of the knuckle 12 on which the wheel is mounted). Loadings on the springs 410 and dampers 400 are absorbed primarily by the connections 26 (lower control arm to sub-frame 18) and 28 (lower control arm to knuckle). The springs and dampers can be positioned as low on the vehicle as the vehicle ground clearance allows. The dampers 400 may alternatively be coupled to the knuckle 12 either fore or aft of the wheel center. The upper mounts of springs 410 may be connected to the sub frame 18 or directly to the vehicle body. The upper mounts of the dampers 400 are connected to the vehicle body.

Generally, connections between the vehicle frame and the wheel support that are subject to forces and force components acting along the vehicle fore-aft axis or along axes parallel to the vehicle fore-aft axis (for example, bushing 24) may be provided with relatively softer bushing connections to provide a softer ride. Also, connections between the frame and the wheel support that are subject to forces and force components acting laterally with respect to the vehicle fore-aft axis (for example, ball joint 26) may be provided with bushings having a relatively greater rigidity, to provide improved handling characteristics.

It will be understood that the foregoing descriptions of various embodiments of the present invention is for illustrative purposes only. As such, the various structural and operational features herein disclosed are susceptible to a number of modifications, none of which departs from the scope of the present invention as defined in the appended claims.

What is claimed is:

1. A wheel suspension system for a vehicle, comprising a first member pivotably coupled to a portion of the vehicle so as to be pivotable about a first rotational axis which forms an angle with a vertical plane extending through a fore-aft axis of the vehicle;

a knuckle for rotatably carrying a wheel;
a rotational connection connecting the knuckle to the first member; and
a second member directly connected only to the first member via at least one rotatable connection and to the knuckle via at least one rotatable connection.

2. The suspension system of claim 1 wherein the first member comprises a lower control arm.

3. The suspension system of claim 1 wherein the first member is coupled to the portion of the vehicle at a first rotational connection positioned along the first axis (X) and at a second rotational connection positioned along the first axis (X), and wherein the second rotational connection is positioned outboard of the first rotational connection with respect to the fore-aft axis.

4. The suspension system of claim 3 wherein the second rotational connection is positioned relatively higher on the vehicle than the first rotational connection.

5. The suspension system of claim 3 wherein a second rotational axis (R) extends through the second rotational connection and the rotational connection 28 connecting the knuckle to the first member, and wherein an angle ($\alpha$) formed between the first axis and the second axis is at least 40 degrees.

6. The suspension system of claim 5 wherein the first rotational connection and the rotational connection connecting the knuckle to the first member are positioned along a plane which extends substantially perpendicular to the fore-aft axis.

7. The suspension system of claim 5 wherein the angle ($\alpha$) formed between the first axis and the second axis is in the range of about 65 to about 85 degrees.

8. The suspension system of claim 7 wherein the angle ($\alpha$) formed between the first axis and the second axis is about 75 degrees.

9. The suspension system of claim 3 wherein a second rotational axis (R) extends through the second rotational connection and the rotational connection connecting the knuckle to the first member, and wherein an angle ($\theta$) formed between the second axis and a plane extending substantially perpendicularly to the vehicle fore-aft axis and through a rotational center of a coupling which pivotably couples the first member to the portion of the vehicle, is in the range of about 35 to about 55 degrees.

10. The suspension system of claim 9 wherein the angle ($\theta$) is about 45 degrees.

11. The suspension system of claim 1 wherein the angle is at least 20 degrees.

12. The suspension system of claim 1 wherein the portion of the vehicle comprises a sub-frame of the vehicle.

13. A vehicle including a suspension system in accordance with claim 1.

14. The suspension system of claim 1 further comprising:
a spring operatively coupled to the first member rearwardly of a rotational axis of the knuckle; and
a damper operatively coupled to the first member rearwardly of the rotational axis of the knuckle.

15. A wheel suspension system for a vehicle, comprising:
a knuckle for rotatably carrying a wheel;
a first member directly connected via at least one rotatable connection to a portion of the vehicle so as to be pivotable with respect to the portion of the vehicle; and
a second member directly connected only to the knuckle via at least one rotatable connection and to the first member via at least one rotatable connection.

16. The suspension system of claim 15 further comprising a rotational connection connecting the knuckle to the first member, wherein the rotational connection connecting the second member to the first member is positioned outboard of the rotational connection connecting the knuckle to the first member with respect to a fore-aft axis of the vehicle.

17. The suspension system of claim 15 wherein the first member comprises a lower control arm.

18. The suspension system of claim 15 further comprising a rotational connection connecting the knuckle to the first member, wherein the rotational connection connecting the second member to the first member is positioned inboard of the rotational connection connecting the knuckle to the first member with respect to a fore-aft axis of the vehicle.

19. The suspension system of claim 15 further comprising a first pair of rotational connections rotatably coupling the first member to the portion of the vehicle, wherein the first member is pivotable about a first axis extending through each rotational connection of the pair of rotational connections, wherein another axis extends through both the rotational connection 32 connecting the second member to the first member and the rotational connection connecting the first member to the knuckle, and wherein a projection of the first axis onto a horizontal plane and a projection of the other axis onto the horizontal plane intersect at a point forward of the knuckle.

20. The suspension system of claim 15 wherein the second member has a longitudinal axis oriented generally perpendicularly to a portion of the first member to which it is rotatably connected.

21. The suspension system of claim 15 wherein the second member comprises a torque link configured for reacting to wind-up torque acting on a wheel attached to the knuckle.

22. A vehicle including a suspension system in accordance with claim 15.

23. The suspension system of claim 15 further comprising a rotational connection connecting the knuckle to the first member, wherein the first member is connected via the at least one rotatable connection to the portion of the vehicle so as to be pivotable about a first axis (X) with respect to the portion of the vehicle, and wherein an angle ($\alpha$) formed between the first axis (X) and a second axis (R) extending between the first axis (X) and the rotational connection connecting the knuckle to the first member is in the range of about 65 degrees to about 85 degrees.

24. The suspension system of claim 23 wherein the angle ($\alpha$) formed between the first axis (X) and a second axis (R) is about 75 degrees.

25. The suspension system of claim 23 wherein an angle ($\theta$) formed between the second axis (R) and a plane (V) extending substantially perpendicularly to the vehicle fore-aft axis and through a rotational center of a rotatable connection connecting the first member to the portion of the vehicle, is in the range of about 35 to about 55 degrees.

26. The suspension system of claim 25 wherein the angle ($\theta$) is about 45 degrees.

27. The wheel suspension system of claim 15 wherein the first member is also connected via a rotatable connection to the knuckle, and wherein the at least one rotatable connection connecting the second member to the knuckle is positioned outboard of the rotational connection connecting the first member to the knuckle, with respect to a fore-aft axis of the vehicle.

28. The suspension system of claim 15 wherein the first member is connected to the portion of the vehicle so as to be rotatable with respect to the portion of the vehicle about a first axis (X) forming an angle of at least 20 degrees with respect to a vertical plane extending through a fore-aft axis (E) of the vehicle.

29. A wheel suspension system for a vehicle, comprising:
a first member coupled to a portion of the vehicle at a first rotational connection and at a second rotational connection,
a knuckle for rotatably carrying a wheel;
a rotational connection connecting the knuckle to the first member; and
a second member directly connected to the first member via a rotatable connection,
wherein the rotational connection connecting the second member to the first member is positioned outboard of the rotational connection connecting the knuckle to the first member with respect to a fore-aft axis of the vehicle.

30. The suspension system of claim 29 wherein the first member comprises a lower control arm.

31. The wheel suspension system of claim 29 wherein an axis (X) extending through both the first rotational connection and the second rotational connection forms an angle of at least 20 degrees with respect to a vertical plane extending through the fore-aft axis of the vehicle.

32. The suspension system of claim 29 wherein a rotational axis (R) extends through the second rotational connection and the rotational connection connecting the knuckle to the first member, and wherein an angle ($\alpha$) formed between the rotational axis (R) and a rotational axis (X) extending through both the first rotational connection and the second rotational connection, is in the range of about 65 degrees to about 85 degrees.

33. The suspension system of claim 32 wherein the angle ($\alpha$) formed between the rotational axis (R) and the rotational axis (X) extending through both the first rotational connection and the second rotational connection is about 75 degrees.

34. The suspension system of claim 29 wherein a rotational axis (R) extends through the second rotational connection and the rotational connection connecting the knuckle to the first member, and wherein an angle ($\theta$) formed between the rotational axis (R) and a plane extending substantially perpendicularly to the vehicle fore-aft axis and through a rotational center of the first rotational connection, is in the range of about 35 to about 55 degrees.

35. The suspension system of claim 34 wherein the angle ($\theta$) formed between the rotational axis (R) and the plane extending substantially perpendicularly to the vehicle fore-aft axis and through the rotational center of the first rotational connection is about 45 degrees.

* * * * *